(12) United States Patent
Gruver

(10) Patent No.: US 6,261,983 B1
(45) Date of Patent: Jul. 17, 2001

(54) MAGNESIA SPINEL REFRACTORY BRICK

(75) Inventor: Steven P. Gruver, York, PA (US)

(73) Assignee: Baker Refractories, York, PA (US)

( * ) Notice: Subject to any disclaimer, the term of this patent is extended or adjusted under 35 U.S.C. 154(b) by 0 days.

(21) Appl. No.: 09/481,576

(22) Filed: Jan. 12, 2000

(51) Int. Cl.⁷ .................. C04B 35/443; C04B 35/106
(52) U.S. Cl. ................... 501/120; 501/104; 501/105
(58) Field of Search ................... 501/104, 105, 501/120

(56) References Cited

U.S. PATENT DOCUMENTS

| | | | |
|---|---|---|---|
| 4,435,514 | 3/1984 | Hartline | 501/117 |
| 4,833,109 | 5/1989 | Macey et al. | 501/120 |
| 4,847,222 | 7/1989 | Knauss et al. | 501/104 |
| 4,954,463 | 9/1990 | Knauss | 501/120 |
| 5,021,374 | 6/1991 | Macey | 501/120 |
| 5,344,802 | 9/1994 | Knauss | 501/120 |
| 5,418,199 | 5/1995 | Knauss | 501/120 |
| 5,565,390 | 10/1996 | Nievoll | 501/120 |

FOREIGN PATENT DOCUMENTS

2000072536A * 3/2000 (JP).

OTHER PUBLICATIONS

Radovanovic, S.V. et al., "Reaction Behaviour of Spinel, Zirconia and Monocalcium Zirconate Under Working Conditions of Cement Kilns," Proceedings of the Unified International Technical Conference on Refractories Fifth Biennial Worldwide Congress (UNITECR), Nov. 7, 1997, 1613–1623.

* cited by examiner

Primary Examiner—Karl Group
(74) Attorney, Agent, or Firm—Woodcock Washburn Kurtz Mackiewicz Kurts & Norris LLP

(57) ABSTRACT

The present invention discloses novel magnesia-spinel refractory compositions and bricks formed thereof that exhibit longer lining life, greater hot strength and reduced tendency to spall under high thermal loading conditions. The invention is designed to slow or retard the reaction between spinel and lime through the addition of zirconia in the form of an alumina-zirconia grain to the refractory mix. Zirconia reacts more readily with the lime in the refractory composition and surrounding environment to form calcium zirconate.

26 Claims, 2 Drawing Sheets

MgO — 99.93%
CaO — 0.07%

ZrO$_2$ — 67.95%
CaO — 30.95%
MgO — 1.72%

Al$_2$O$_3$ — 74.86%
MgO — 25.14%

ZrO₂ – 67.91%
CaO – 30.20%
MgO – 1.90%

Al₂O₃ – 75.17%
MgO – 24.83%

MgO – 99.32%
CaO – 0.12%
SiO₂ – 0.11%
Fe₂O₃ – 0.45%

MAGNESIA SPINEL REFRACTORY BRICK

FIELD OF THE INVENTION

The present invention relates to magnesia-spinel refractory mixes, and shapes such as bricks made therefrom, which exhibit improved longevity despite high thermal loading and corrosive conditions. More particularly, the magnesia-spinel refractories of the present invention exhibit a reduced tendency to react with lime present in the refractory environment.

BACKGROUND OF THE INVENTION

Refractory bricks are subject to extreme temperature conditions, frequent thermal cycling, and corrosive attack. For many years, magnesia-chrome refractories were used as liners for rotary lime kilns, cement kilns, or similar uses, because they displayed properties that met the demands of the refractory environment. Magnesia-chrome bricks exhibited long wear, high melting temperatures, low thermal conductivity, good hot strength, and good thermal shock resistance. Despite these many advantages, magnesia-chrome based refractory linings also suffered a serious disadvantage. The chrome within the magnesia-chrome brick reacted with the lime and alkali in the refractory environment to form hexavalent chrome. Hexavalent chrome was categorized as a toxic material requiring special disposal measures. Thus, the use of refractory linings fabricated from magnesia-chrome resulted in costly disposal and remediation procedures at the end of their use. These issues forced manufacturers to seek other alternative materials for refractory liners.

For the past 20 years, magnesia-spinel brick became widely used in the art as an alternative for magnesia-chrome brick liners. The magnesia, MgO, present in the magnesia-spinel brick makes the brick basic so that it can withstand the highly basic environment of the rotary cement kiln. Magnesia, however, exhibits high thermal expansion, high thermal conductivity, and poor thermal shock resistance. To alleviate these problems, spinel, $MgAl_2O_4$, is added into the refractory mix. Spinel has lower thermal conductivity and lower thermal expansion than magnesia. When spinel is added to the magnesia, the magnesia is essentially diluted and the thermal expansion and thermal conductivity of the refractory is thereby reduced. Thermal shock resistance is also improved because of the large difference in thermal expansion between the magnesia and spinel. This thermal expansion mismatch creates microcracks in the brick, which improves thermal shock resistance. Thus, the addition of spinel to the magnesia product creates a refractory that is basic in chemistry and has good thermal shock resistance, low thermal conductivity, and low thermal expansion.

Over the 20-year period of magnesia-spinel brick use, several distinct evolutionary steps in composition formulation can be identified. These distinct steps are generally referred to as 'generations' within the refractory industry. First generation magnesia-spinel brick are based on the use of magnesia and in situ spinel. The in situ spinel is formed by adding small amounts of relatively coarse alumina to the brick to form spinet during firing. Second generation magnesia-spinel brick are characterized by the use of preformed spinet in the brick. The use of preformed spinel allowed more spinel to be added to the brick, which improved thermal shock resistance and lowered thermal expansion and conductivity. The preformed spinet grain added to the composition can be either sintered or fused. Third generation magnesia-spinel brick are characterized by the use of preformed spinet in combination with a very fine alumina addition. The fine alumina reacts with the magnesia fines in the mix during firing to form in situ spinet, commonly referred to as a spinet matrix. The addition of fine alumina to the refractory composition lowers porosity, permeability, and improves intermediate temperature strength at temperatures of about 2300° F.

Unfortunately, third generation magnesia-spinel brick are not an ideal replacement for the magnesia-chrome bricks because they do not perform well under high thermal loading conditions. First, the third generation magnesia-spinel brick exhibit low strength performance, below 300 psi, at high temperatures (greater than 2500° F.). Second, the spinel portion of the brick, particularly in the matrix, is susceptible to corrosion when exposed to high lime slags or clinkers within the refractory environment. As a result, the service performance of these bricks under high thermal loading conditions is limited and more frequent replacement of these liners is warranted.

The spinel is generally the "weak link" in all types of magnesia-spinel brick used in high temperature zones of the rotary kiln. The alumina within the spinel readily reacts with lime to form calcium-aluminates. Some of these calcium-aluminate phases tend to have lower melting temperatures, below 2500° F., than the temperatures of the refractory environment. Additionally, if silica is present, as is often the case in a refractory melt, calcium-aluminum-silicate phases can form which also have lower melting points than the temperatures of the refractory environment. Therefore, magnesia-spinel bricks do not perform well in kilns that operate at fairly high temperatures or temperatures above about 2500° F. These bricks weaken as certain phases soften and melt into liquid phases within the brick above about 2500° F. Lastly, these liquid phases can cause densification at the hot face, which can eventually lead to spalling.

Accordingly, there exists a need in the art to develop a refractory brick with improved strength, particularly above 300 psi, when used at temperatures exceeding 2700° F., and also to develop a refractory brick that has improved resistance to lime thereby increasing its service life.

SUMMARY OF THE PRESENT INVENTION

The present invention discloses a magnesia-spinel brick that exhibits high strength, above 300 psi, at temperatures greater than or equal to about 2700° F. These enhanced properties are achieved through the addition of a fine, fused alumina-zirconia grain which enhances the high temperature strength of the magnesia-spinel brick refractory. An additional benefit of the fused alumina-zirconia addition is an improvement in the brick's resistance to chemical attack and spalling.

The addition of zirconia to the refractory mix alleviates some of the problems attributable to spinel. Lime, present as an impurity in the magnesia-spinel brick composition or that can come in contact with the brick during use, extracts the alumina within the spinet to form calcium aluminates. Calcium aluminates have lower melting points than the typical operating temperatures that the refractory must withstand. Subsequently, the hot strength of the magnesia-spinel brick is lowered. The addition of zirconia to the magnesia-spinel brick composition results in the reaction of zirconia with lime to form calcium zirconates or $CaZrO_3$. The reaction of zirconia with lime, however, is more preferred than the reaction of alumina with the lime. Zirconia therefore acts as a "lime sponge" and inhibits the formation of low melting calcium aluminates.

The present invention provides a refractory composition that is useful for making the described magnesia-spinel brick. The refractory composition generally contains magnesia grain, spinel, alumina-zirconia grain, and optionally, alumina. The magnesia grain is present in the refractory composition in the amount of at least about 65% by weight or greater. More preferably, the magnesia grain is present in the amount of at least about 75% by weight or greater. Even more preferably, the magnesia grain is present in the amount of at least about 80% by weight or greater. The magnesia grain has a MgO content of at least about 97% by weight and a lime content less than about 1.5% by weight. The particle size of the magnesia grain can vary. However, in preferred embodiments, the particle size of the magnesia grains range from about −4.75 millimeter ("mm") through about 250 micron ("$\mu$m"). The fine magnesia grains are about 90% −45 $\mu$m.

As previously mentioned, the refractory composition or mix comprises preformed spinel grain. The preformed spinel grain is present in the refractory composition in the amount ranging between about 3% by weight and about 25% by weight. More preferably, the preformed spinel grain is present in the amount ranging between about 7% by weight and about 18% by weight. Even more preferably, the preformed spinel grain is present in the amount ranging between about 10% by weight and about 15% by weight, or about 12.5% by weight. In some embodiments, the preformed spinel grain can be either alumina rich, stoichiometric ($MgAl_2O_4$), or magnesia rich spinel ($MgO_x \cdot MgAl_2O_4$, where x>0). In preferred embodiments, the preformed spinel grain is stoichiometric ($MgAl_2O_4$) spinel or contains about 28% by weight of magnesia and the balance alumina. Preferably, the preformed spinel grain contains at least about 66% by weight of alumina and at most about 33% by weight of magnesia. The preformed spinel grain added to the mix can be sintered or fused. A sufficient quantity of preformed spinel, and optionally, fine alumina, is added to the composition such that the overall alumina content of the refractory composition (including the alumina present in the alumina-zirconia grain) is about 3 to about 15% by weight.

The amount of alumina-zirconia grain added to the composition should range from about 0.5 to about 10% by weight. In preferred embodiments, the alumina-zirconia grain ranges from about 3 to about 7% by weight. More preferably, the weight percentage of alumina-zirconia grain added to the composition ranges from about 4 to about 6%, or about 5%. The alumina-zirconia grain can be fused or sintered. The alumina-zirconia grain is preferably added as a fine, fused alumina-zirconia grain. By adding the zirconia in this manner, the refractoriness of the shaped bodies is improved due to the incorporation of zirconia within the brick matrix.

It is to be understood that both the foregoing general description and the following detailed description are exemplary and explanatory and are intended to provide further explanation of the invention as claimed. The accompanying drawings are included to provide a further understanding of the invention and illustrate one embodiment of the invention.

A more complete understanding of the present invention, as well as further features and advantages of the invention such as its application to other high temperature resistant products, will be apparent from the following detailed description and the accompanying drawings.

Figure 1A:
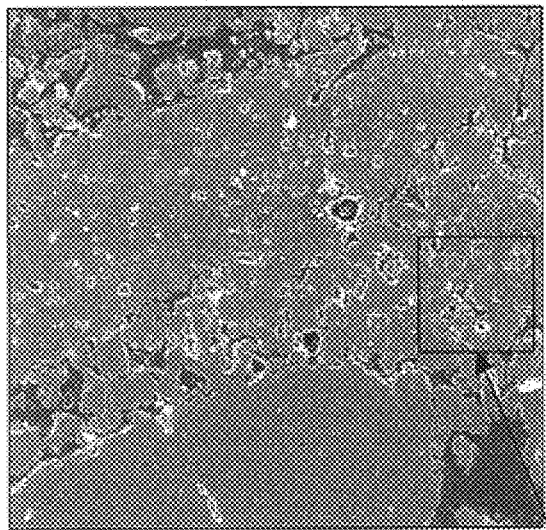
FIGS. 1a, 1b, 1c and 1d are SEM photographs that illustrate the magnesia spinel composition of the present invention.

Reference will now be made in detail to a present preferred embodiment of the invention, an example of which is illustrated in the accompanying drawing.

DETAILED DESCRIPTION

The present invention provides a refractory composition suitable for forming shaped bodies, such as refractory bricks used, for example, in rotary cement kiln linings. The refractory composition contains magnesia grain, spinel grain, and a fine, alumina-zirconia grain. Optionally, the refractory composition may further contain alumina. The present invention provides an improved magnesia-spinel refractory that is less susceptible to reaction with lime.

The present invention discloses the use of a preformed alumina-zirconia grain as an additive to a refractory composition used to prepare magnesia-spinel bricks. The zirconia within the alumina-zirconia grain prevents or retards the reaction between lime and alumina and subsequently increases the refractoriness of the magnesia-spinel brick. The improved magnesia-spinel brick can be used in high thermal loading situations. Zirconia has a very high affinity for lime, more so than the alumina present in the refractory composition. Therefore, any lime present initially in the refractory composition or that may come in contact with the fired shaped body (e.g. brick) will react with the zirconia rather than with the alumina in the spinel. As the zirconia from the alumina-zirconia grain reacts with the lime, calcium zirconate is formed in preference to the formation of calcium aluminate. Calcium zirconate is a very refractory mineral that is extremely compatible with lime. The alumina from the alumina-zirconia grain forms in situ spinel, providing all of the benefits of in situ spinel formation.

The amount of alumina-zirconia grain added to the refractory composition should range from about 0.5 to about 10%, more preferably from about 3 to about 7%, or even more preferably from about 4 to about 6% by weight. The alumina-zirconia grain preferably has a particle size distribution of about 150 mesh or below, i.e., about 100% passes through a 100 sieve (U.S. Sieve Series) screen, a maximum of about 15% on a 140 sieve, a minimum of about 40% retained on a 200 and 140 sieve screen, and a maximum of about 3% through a 325 sieve screen. The alumina-zirconia grain can be either fused or sintered. The preferred embodiments of the present invention employs an alumina-zirconia grain. The addition of the alumina-zirconia grain allows for the most intimate contact between the zirconia and alumina so that the zirconia can protect the alumina and prevent it from reacting with lime to form calcium aluminate. Most calcium aluminate is formed when the fine alumina addition used to make third generation brick reacts with the lime in the system rather than the MgO. This calcium aluminate is incorporated into the structural matrix of the brick where it can cause the most damage. By having both the zirconia and the alumina present in the fines as a fine alumina-zirconia grain, the zirconia is available to react with any free lime which would otherwise react with the alumina. It is preferred to use a fused alumina-zirconia grain for forming the in situ spinel in the matrix. When the alumina and the zirconia are fused together, the alumina and zirconia are in a highly intimate, homogeneous contact. As spinel is formed in situ, the zirconia is present to react with any lime that would otherwise form calcium aluminate.

The alumina-zirconia grain that is useful in the present invention can have a varying chemical composition. It is preferred that the grain be of relatively high purity. Thus, the alumina-zirconia grain generally contains at least about 75%, preferably at least about 85%, more preferably at least about 90%, and even more preferably at least about 95% by weight alumina-zirconia. Advantageously, the alumina-zirconia grain is of high purity such that it contains at least about 98 or about 99% wt. alumina-zirconia. Other alumina-zirconia blends, or blends that comprise other elements or components (i.e., a fused alumina-zirconia-spinel grain), can be used without departing from the spirit of the present invention. Generally, the alumina-zirconia grain contains between about 25 and about 75 percent by weight alumina and correspondingly between about 75 and about 25 percent by weight zirconia, and preferably at least about 50% by weight alumina. While it is preferred that the alumina-zirconia grain be fused, a sintered grain can also be used. It is preferred that the alumina-zirconia grain is added into the refractory composition in an amount such that there is provided about 0.1% to about 5%, preferably about 0.2% to about 3%, and more preferably about 0.5% to about 2% by weight zirconia.

The refractory compositions of the present invention also include the addition of a spinel. In preferred embodiments, the spinel is a preformed spinel grain. Generally, the amount of spinel is between about 3% to about 25% by weight of the refractory composition. More preferably, the preformed spinel grain is present in the amount ranging between about 7% by weight and about 18% by weight. Even more preferably, the preformed spinel grain is present in the amount ranging between about 10% by weight and about 15% by weight, or about 12.5% by weight. The preformed spinel grain may be either alumina rich, stoichiometric ($MgAl_2O_4$), or magnesia rich spinel ($MgO_x \cdot MgAl_2O_4$, where x>0). In a preferred embodiment, the preformed spinel grain is stoichiometric ($MgAl_2O_4$) spinel or contains about 28% by weight of magnesia and the balance alumina. More preferably, the preformed spinel grain contains about 66% by weight or greater of alumina and about 33% by weight or less of magnesia. In other embodiments, the magnesia rich spinel is comprised of about 28% or greater of MgO. The preformed spinel grain added to the mix can be sintered or fused. The particle size of the preformed spinel grain can vary between about −4 mesh sieve (4.75 mm) and about +60 mesh sieve (250 $\mu$m), but approximately 95% by weight preferably passes through a 8 mesh sieve and is retained on a 28 mesh sieve. It is understood, however, that fused spinel or other forms and particle sizes of spinel can also be utilized without departing from the spirit of the present invention.

Alumina may be optionally added in an amount up to about 7% by weight of the composition to foster formation of in situ spinel. Alumina may be added to the refractory compositions in two ways. Fine tabular alumina, which forms in situ spinel, can be added as a straight addition and/or as a fine, fused alumina-zirconia grain. The particle size for either the tabular alumina or the fused alumina-zirconia grain is about 150 mesh or below. Alternatively, calcined or other forms of alumina may be used without departing from the spirit of the present invention. A sufficient quantity of preformed spinel, fine alumina, and/or alumina-zirconia grain to form in situ spinel may be added to the composition such that the overall alumina content of the fired refractory body is about 3 to about 30% by weight, or more preferably, about 3% to about 15% by weight.

The refractory compositions of the present invention also comprise at least 65% by weight or greater, preferably at least 75% by weight or greater, or more preferably, at least 80% by weight or greater of magnesia grain. The magnesia grain has a MgO content of at least about 97% by weight and a lime content less than about 1.5% by weight. In preferred embodiments, a sintered magnesia grain is used. However, a fused magnesia grain can be also used in lieu of a sintered grain. The particle size distribution of the magnesia grains is generally 100% below 3 mesh, with about 20% by weight and below fine, or below 60 mesh.

The various components of the refractory composition are combined with minor additions of water, a binder and/or lubricants. A binder is generally added to bind the mix and aid in holding the shape of the green body during subsequent handling prior to firing. Typical binders used in the art may include, but are not limited to, methyl cellulose, dextrin, ethyl cellulose, lignosulfonate. The percentage of binder addition can range up to about 5% by weight, more preferably about 0.5% to about 1.5% by weight, depending upon the forming process. Preferably, the binder is an organic compound that burns off during the firing step. Lubricants may be added in minor amounts to aid processing. It is understood that the refractory compositions of the present invention can be formed into various shaped bodies using conventional processes, such as pressing or extrusion processes, known in the art.

After forming the composition into a green shaped body, such as a refractory brick, the green body is sintered or fired using conventional methods known in the art. A fired, shaped body, made from the refractory composition of the present invention, comprises between about 72% to about 95% by weight of MgO, between about 3% and about 25% by weight of $Al_2O_3$, and between about 0.25% and about 3% by weight of $ZrO_2$. Preferably, the refractory bodies comprise between about 80% to about 90% by weight of MgO, between about 7% and about 15% by weight of $Al_2O_3$, and between about 1% and about 2 % by weight of $ZrO_2$. The refractory bodies made from the refractory compositions of the present invention also comprise minor amounts of about 1% by weight or less of CaO, about 0.20% by weight or less of $Fe_2O_3$, and about 0.15% by weight or less of $SiO_2$.

Accordingly, the refractory shapes or bricks of the present invention exhibit relatively high hot strength properties. Refractory bricks of the present invention can exhibit a modulus of rupture ("MOR") at 2700° F. of at least about 300 psi, 400 psi, 500 psi, and in some cases, at least about 600 psi and a MOR at 2500° F. of at least about 800 psi, 900 psi, 1000 psi, 1100 psi, and in some cases, at least about 1200 psi.

Figure 1B:
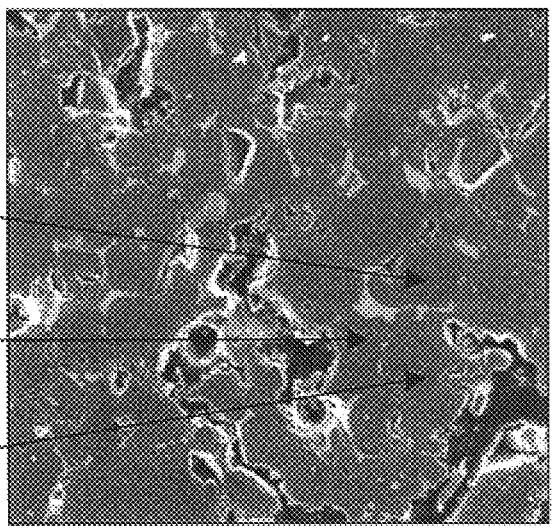
Figure 1C:
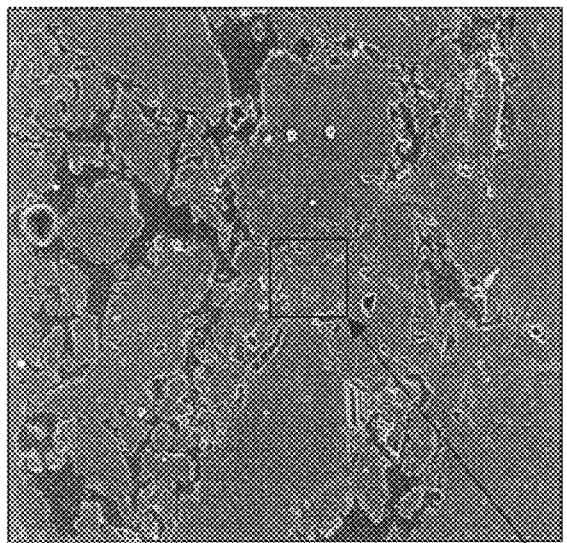
Figure 1D:
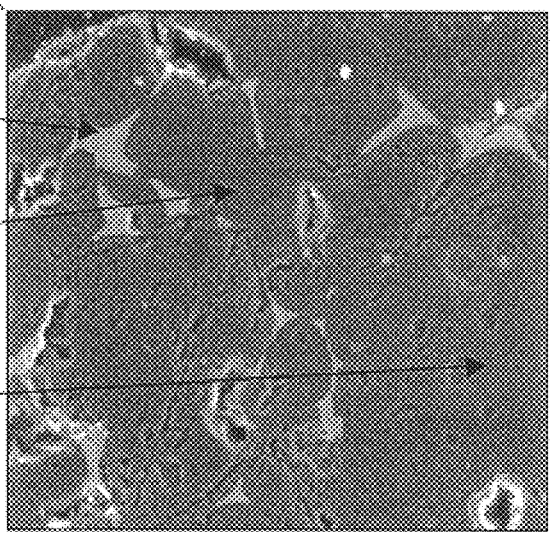

FIG. 1a is a SEM photograph taken at a magnification of 40 that shows the magnesia spinel composition of the present invention. FIG. 1b is a subset of the sample of FIG. 1a taken at a magnification of 160. FIG. 1c is a SEM photograph taken at a magnification of 40 that shows a different sample of the magnesia spinel composition of the present invention. FIG. 1d is a subset of the sample of FIG. 1c taken at a magnification of 320. As FIG. 1b and FIG. 1d illustrate, the zirconia present in the composition reacts with the lime to form calcium zirconate. There is no evidence of the presence of calcium aluminates within the composition. The resultant brick has higher hot strength and is more resistant to reaction with the cement clinker.

A variety of refractory shapes can be formed from the compositions disclosed in the present invention by a variety of pressing or other forming methods. The amount of binder and water in the mix, as well as the particle size and shape of the various constituents, can be varied based upon the forming method chosen. The preferred embodiment of the present invention is a refractory mix, and shapes formed thereof, for rotary kiln linings for the cement industry.

It is understood, however, that the present invention is not limited to this embodiment. Other variations in the particle size, shape and form for each element will not deviate from the spirit of the present invention. Moreover, the refractory mixes of the present invention are not limited to rotary cement kiln brick compositions. There are many applications in the steel, glass, and copper industry where a basic refractory having good thermal shock resistance and high hot strength is required.

EXAMPLE

Refractory Brick

Eight magnesia spinel refractory compositions were made in accordance with the present invention and are reflected in Table I. The magnesia used in these examples, MgO Type A, had a MgO content of about 98.8% by weight and a lime content of about 0.8% by weight. Table II provides the chemical analyses of the magnesia grains used in these refractory mixes. The particle size distribution of the magnesia used in each composition is reflected in Table III. The mesh sizes in the table correspond to U.S. Standard Sieve sizes. The preformed spinel used in the examples was a sintered grain having a particle size distribution of −8+28 mesh, or greater than about 95% passing through a 8 mesh sieve and less than about 95% retained on a 28 mesh sieve. Dextrin and water were used as binders for forming the brick.

The refractory mix was mixed in a high intensity mixer and then pressed into 9"×6"×3" bricks using a dry press at a pressure of 10.2 tsi. The green bricks were then fired in a kiln at a temperature of 1650° C. for 10 hours. The chemical analysis of the finished bricks for each example is reflected in Table III. The chemistries for each brick were obtained via X-ray fluorescence analysis.

Further analysis was conducted on each brick in Examples 1 through Example 8 using X-ray diffraction. The Example 1 brick showed peaks indicating the presence of MgO and Spinel. Example bricks 2 through 4 exhibited peaks which corresponded to the presence of MgO, Spinel, $CaZrO_3$, and trace amounts of partially stabilized $ZrO_2$. Lastly, Example bricks 5 through 8 showed similar peaks as the Example 2 through 4 bricks, but further exhibited a larger quantity of $ZrO_2$. The presence of $ZrO_2$ in these bricks illustrates that there is $ZrO_2$ available in the system to act as a lime sponge.

TABLE I

| | Refractory Compositions | | | | | | | |
|---|---|---|---|---|---|---|---|---|
| Materials | 1 | 2 | 3 | 4 | 5 | 6 | 7 | 8 |
| MgO Type A | 79 | 81 | 80 | 79 | 78 | 76 | 84.5 | 84.5 |
| Spinel | 12.5 | 12.5 | 12.5 | 12.5 | 12.5 | 12.5 | 8.0 | 8.0 |
| Alumina-zirconia | — | 3.0 | 4.0 | 5.0 | 6.0 | 8.0 | 4.0 | — |
| Alumina | 5 | — | — | — | — | — | — | 3.07 |
| Zirconia | — | — | — | — | — | — | — | 0.93 |
| Dextrin | 1.5 | 1.5 | 1.5 | 1.5 | 1.5 | 1.5 | 1.5 | 1.5 |
| Water | 2.0 | 2.0 | 2.0 | 2.0 | 2.0 | 2.0 | 2.0 | 2.0 |

TABLE II

| Chemical Analysis | MgO Type A |
|---|---|
| MgO | 98.8 |
| CaO | 0.8 |
| $Fe_2O_3$ | 0.1 |
| $Al_2O_3$ | 0.1 |
| $SiO_2$ | 0.15 |

TABLE III

| Particle Size Distribution MgO | 1 | 2 | 3 | 4 | 5 | 6 | 7 | 8 |
|---|---|---|---|---|---|---|---|---|
| −3 + 7 | 5 | 5 | 5 | 5 | 5 | 5 | 5 | 5 |
| −7 + 14 | 17.5 | 17.5 | 17.5 | 17.5 | 17.5 | 17.5 | 22 | 22 |
| −14 + 30 | 20 | 20 | 20 | 20 | 20 | 20 | 20 | 20 |
| −30 + 60 | 15 | 15 | 15 | 15 | 15 | 15 | 15 | 15 |
| −60 | 5 | 5 | 5 | 5 | 5 | 5 | 5 | 5 |
| Ball Mill Fines ("BMF") | 20 | 22 | 21 | 20 | 19 | 17 | 21 | 21 |

TABLE IV

| Chemical Analysis | 1 | 2 | 3 | 4 | 5 | 6 | 7 | 8 |
|---|---|---|---|---|---|---|---|---|
| MgO | 85.66 | 87.24 | 86.72 | 86.96 | 84.63 | 82.74 | 89.97 | 90.37 |
| CaO | 0.84 | 0.91 | 0.85 | 0.84 | 0.84 | 0.80 | 0.90 | 0.92 |
| $Fe_2O_3$ | 0.13 | 0.16 | 0.14 | 0.11 | 0.11 | 0.14 | 0.15 | 0.14 |
| $Al_2O_3$ | 13.01 | 10.80 | 10.95 | 10.74 | 12.71 | 14.01 | 7.73 | 7.63 |
| $SiO_2$ | 0.10 | 0.12 | 0.11 | 0.09 | 0.11 | 0.11 | 0.12 | 0.12 |
| $ZrO_2$ | 0.00 | 1.09 | 1.50 | 1.87 | 2.17 | 2.67 | 1.38 | 1.37 |

Table V reflects the resultant properties of the eight example bricks. The green bulk density ("B.D.") and fired B.D. of each brick were measured in accordance with ASTM C134. The modulus of rupture ("MOR") of each brick, which is the fracture strength of a material under a bending load, was measured using a 3 point configuration in accordance with ASTM C-133. The load test at 2822° F. was determined in accordance with ASTM C16. The % porosity and permeability of the bricks were measured in accordance with ASTM C-830 and ASTM C-577, respectively. The PLC, or percentage of linear change, was obtained in accordance with ASTM C-113. Lastly, the hot modulus of rupture testing was performed in accordance with ASTM C-583 and used to evaluate the refractoriness of the system. For spinel containing brick, higher MOR values at temperatures of 2500° F. or greater tend to provide a good indication of refractoriness.

The shocked MOR, which measures the thermal shock and spalling resistance of the brick, was also measured using a 3 point configuration. The % Retained, which determines the percentage of retained strength after thermal shocking of the bricks, was obtained in accordance with an in-house method. This test compares the MOR before and after thermal cycling. The brick samples for each composition were cut into halves or two equal pieces. MOR values were obtained on one brick half whereas the other half was thermally shocked at a temperature of 1900° F. The brick halves which were thermally shocked were placed in an electric furnace set at 1900° F. and soaked for 1 hour. The brick samples were then removed from the furnace and allowed to cool to room temperature, after which MOR was measured. The percent retained strength is equal to the shocked MOR divided by the unshocked MOR and multiplied by 100%.

TABLE V

| Properties | 1 | 2 | 3 | 4 | 5 | 6 | 7 | 8 |
|---|---|---|---|---|---|---|---|---|
| Green B.D. (g/cc) | 3.001 | 2.994 | 2.989 | 2.99 | 2.988 | 2.984 | 2.996 | 3.019 |
| Fired B.D. (g/cc) | 2.92 | 2.913 | 2.900 | 2.893 | 2.885 | 2.862 | 2.912 | 2.954 |
| MOR (psi) | 829 | 834 | 840 | 708 | 650 | 582 | 876 | 1068 |
| Shocked MOR (psi) | 687 | 780 | 672 | 649 | 606 | 545 | 826 | 983 |
| % Retained | 83 | 94 | 80 | 92 | 93 | 94 | 94 | 92 |
| Load Test (%) | −0.31 | −0.07 | −0.02 | −0.01 | −0.01 | 0.05 | −0.05 | −0.07 |
| Porosity (%) | 45.84 | 16.59 | 17.15 | 17.36 | 17.73 | 18.36 | 16.87 | 15.68 |
| Permeability (cD) | 127 | 214 | 227 | 245 | 309 | 300 | 241 | 186 |
| PLC (%) | 0.24 | 0.36 | 0.37 | 0.30 | 0.25 | 0.55 | 0.38 | 0.49 |
| Hot MOR (psi) 2300° F. | 2041 | 1651 | 1929 | 1748 | 1722 | 1548 | 1704 | 2049 |
| Hot MOR (psi) 2500° F. | 818 | 902 | 1315 | 935 | 1104 | 977 | 1064 | 867 |
| Hot MOR (psi) 2700° F. | 497 | 268 | 466 | 678 | 577 | 340 | 458 | 307 |

Example 1 is a control brick that was made with no alumina-zirconia addition. In the Example 1 composition, the preformed spinel addition is 12.5% and the fine alumina addition for forming in situ spinel is 5%. Examples 2 through 7 show the effects of adding alumina-zirconia to this type of product. The alumina-zirconia was added as a fine (240 grit) fused grain. Additions of about 3 to 8% by weight alumina-zirconia grain were used. It can be seen that the hot strength (MOR at 2500° F. and above) increased dramatically with the alumina-zirconia addition. The 2700° F. MOR values increased from 197 psi when no alumina-zirconia was used to 678 psi when 5% alumina-zirconia grain was added. This results in a greater than 300% increase in hot strength. At an addition of 5% alumina-zirconia grain, the overall zirconia content of Example 4 was 1.87%. It should be noted that while hot strength was increased, no compromise in thermal shock resistance was observed.

Examples 7 and 8 compare the differences between adding zirconia as an alumina-zirconia grain or as straight zirconia. Both examples exhibited very good hot strength which illustrates the advantage of adding zirconia. However, Example 7 shows that adding the zirconia in the form of an alumina-zirconia grain is a superior method for enhancing hot strength. The 2700° F. MOR value for Example 7 was approximately 150 psi higher than that of Example 8.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

We claim:

1. A refractory composition that can be fired to make a shaped refractory body, said composition comprising,
   a. magnesia grain present in the amount of at least about 65% by weight;
   b. preformed spinel grain present in the amount of about 3% to about 25% by weight; and
   c. alumina-zirconia grain present in the amount of about 0.5 to about 10% by weight.

2. The refractory composition of claim 1 further comprising alumina grain present in the amount up to about 7% by weight.

3. The refractory composition of claim 1 wherein said magnesia grain consists of about 97% by weight or greater of MgO.

4. The refractory composition of claim 1 comprising about 75% by weight or greater of said magnesia grain.

5. The refractory composition of claim 1 comprising about 80% by weight or greater of said magnesia grain.

6. The refractory composition of claim 1 comprising between about 7% by weight and about 18% by weight of said preformed spinel grain.

7. The refractory composition of claim 1 comprising between about 10 by weight and about 15% by weight of said preformed spinel grain.

8. The refractory composition of claim 1 wherein the alumina-zirconia ain is fused.

9. The refractory composition of claim 1 wherein the alumina-zirconia grain is sintered.

10. The refractory composition of claim 1 comprising about 3% to about 7% by weight of said alumina-zirconia grain.

11. The refractory composition of claim 1 comprising about 4% to about 6% by weight of said alumina-zirconia grain.

12. The refractory composition of claim 1 wherein said alumina-zirconia grain is comprised of about 50% by weight or greater alumina.

13. The refractory composition of claim 4 wherein the particle size of said fused alumina-zirconia grain is below 150 mesh.

14. The refractory composition of claim 1 wherein said preformed spinel grain is comprised of at least about 66% by weight $Al_2O_3$.

15. The refractory composition of claim 1 wherein said preformed spinel grain is comprised of at least about 28% by weight MgO.

16. A shaped refractory body, made from the refractory composition of claim 1, wherein the refractory body exhibits a modulus of rupture (MOR) at 2500° F. of about 800 psi or greater.

17. A shaped refractory body, made from the refractory composition of claim 1, wherein the refractory body exhibits a modulus of rupture (MOR) at 2700° F. of about 300 psi or greater.

18. A refractory composition that can be fired to make a shaped body, said composition comprising,
   a. magnesia grain present in the amount of at least about 65% by weight;
   b. preformed spinel grain present in the amount of about 3% to about 25% by weight; and
   c. alumina-zirconia grain present in the amount of about 0.5 to about 10% by weight, wherein the alumina-zirconia grain provides from about 0.1 to about 5% by weight zirconia in said refractory composition.

19. The refractory composition of claim 18 wherein the zirconia content is from about 0.2% to about 3% by weight of the refractory composition.

20. A shaped body, made from the refractory composition of claim 18, wherein the shaped body exhibits a modulus of rupture (MOR) at 2700° F. of about 300 psi or greater.

21. A method of making a refractory brick, said method comprising:
   a. preparing a refractory composition, said refractory composition comprising about 65% by weight or greater of magnesia grain, about 3% to about 25% by weight of preformed spinel grain, about 0.5% to about 10% by weight of alumina-zirconia grain, up to about 5% by weight of binder and about 0% to about 5% by weight of water;
   b. blending said refractory composition to form a mix;
   c. pressing said mix to form a green brick; and
   d. heating said green brick to a temperature sufficient to form said refractory brick.

22. The method of claim 21 wherein the magnesia grain within said preparing step comprises about 97% by weight or greater of MgO.

23. The method of claim 21 wherein the preformed spinel grain within said preparing step has a particle size distribution such that at least 90% of said preformed spinel grain is between 8 and 28 mesh.

24. The method of claim 21 wherein the alumina-zirconia within said preparing step is fused.

25. The method of claim 21 wherein the refractory brick within said heating step has a modulus of rupture (MOR) at 2500° F. of about 800 psi or greater.

26. The method of claim 21 wherein the refractory brick within said heating step has a modulus of rupture (MOR) at 2700° F. of about 300 psi or greater.

* * * * *

UNITED STATES PATENT AND TRADEMARK OFFICE
CERTIFICATE OF CORRECTION

PATENT NO. : 6,261,983 B1
APPLICATION NO. : 09/481576
DATED : July 17, 2001
INVENTOR(S) : Steven P. Gruver It is certified that error appears in the above-identified patent and that said Letters Patent is hereby corrected as shown below:

Col 1, line 40, change "spinet" to --spinel--.

Col. 1, line 47, change "spinet" to --spinel--

Col. 1, line 50, change "spinet" to --spinel--

Col. 1, line 58, change "spinet" to --spinel--

Col. 1, line 60, change "spinet" to --spinel--

Col. 1, line 62, change "spinet" to --spinel--

Col. 1, line 65, change "spinet" to --spinel--

Col. 2, line 1, change "spinet" to --spinel--

Col. 2, line 3, change "spinet" to --spinel--

Col. 2, line 4, change "spinet" to --spinel--

Col. 2, line 54, change "spinet" to --spinel--

Col. 2, line 57, change "spinet" to --spinel--

Col. 5, line 21, change "spinet" to --spinel--

Col. 5, line 22, change "spinet" to --spinel--

Col. 5, line 23, change "spinet" to --spinel--

Col. 5, line 25, change "spinet" to --spinel--

Col. 5, line 27, change "spinet" to --spinel--

Col. 5, line 30, change "spinet" to --spinel--

Col. 5, line 31, change "spinet" to --spinel--

Col. 5, line 33, change "spinet" to --spinel--

UNITED STATES PATENT AND TRADEMARK OFFICE
CERTIFICATE OF CORRECTION

PATENT NO. : 6,261,983 B1
APPLICATION NO. : 09/481576
DATED : July 17, 2001
INVENTOR(S) : Steven P. Gruver It is certified that error appears in the above-identified patent and that said Letters Patent is hereby corrected as shown below:

Col. 6, line 17, change "bums" to --burns--

Col. 10, line 31, (claim 8) change "ain" to --grain--

Signed and Sealed this

Second Day of January, 2007

JON W. DUDAS
*Director of the United States Patent and Trademark Office*